United States Patent Office 3,746,677
Patented July 17, 1973

3,746,677
ADHESIVE COMPOSITION HAVING HIGH
INITIAL ADHESIVE STRENGTH
Haruhiko Arai, Narashino, and Shoji Horin, Ichikawa,
Japan, and Iwao Maruta, deceased, late of Funabashi,
Japan, by Koyoko Maruta and Yoshi Maruta, heirs,
Funabashi, Japan, assignors to Kao Soap Co., Ltd.,
Tokyo, Japan
No Drawing. Filed Mar. 4, 1971, Ser. No. 121,197
Claims priority, application Japan, Mar. 5, 1970,
45/18,880
Int. Cl. C09j 3/26
U.S. Cl. 260—27 R                            3 Claims

ABSTRACT OF THE DISCLOSURE

The invention relates to a composition having high initial adhesive strength consisting of a mixture of (A) a synthetic high molecular weight vinyl compound in aqueous dispersion with (B) a resin acid surface active agent and (C) a vinyl polymer emulsion.

BACKGROUND OF THE INVENTION

Field of the invention

This invention relates to improved adhesive compositions which have a high initial adhesive strength and are applicable for adhering together a wide range of articles.

Description of the prior art

Aqueous solutions of natural high molecular compounds such as glue and starch and of synthetic high molecular compounds such as polyvinyl alcohol have been widely used as adhesives, but they have only a poor initial strength, i.e. a low adhesive power directly after being applied but before being dried, and they have only inferior workability. Vinyl polymer emulsions usually used currently in place of the above aqueous solutions have superior initial adhesive strength compared to the aqueous solutions of the above mentioned high molecular compounds, and they are applicable to a wider range of objects. However, they cannot sufficiently meet the needs of high speed adhesion required by the mechanised operations and also the broadening of candidate objects to be treated as a result of the development of plastics. Though it has been recognized that the range of objects to be treated can be expanded by incorporating a plasticizer such as dibutyl phthalate in vinyl polymer emulsions, their initial adhesive power has been still insufficient.

SUMMARY OF THE INVENTION

The invention constitutes basically a three-component adhesive composition with the novel and unique characteristic of having a high initial adhesive strength over a wide range of substrate materials. This property renders it particularly valuable as a commercial adhesive in the many applications where rapid adhesive strength is required in high-speed operations.

The adhesive is characterized by being composed of an aqueous solution or dispersion of (A) a synthetic high molecular weight vinyl resin which is normally water-insoluble, (B) a resin acid anionic surface active agent and (C) an emulsion polymerized vinyl polymer.

In these novel adhesives the relative proportions, on a solid weight basis, of (A) to (B) is in the range of 10:100 to 100:10. The relative proportions of (A) to (C), on a solid weight basis, is at least 1:10 and preferably 10-100:100.

The degree of polymerization of (A) is at least 10 and preferably is in the range of 100 to 3,000.

The degree of polymerization of (C) is at least 100 and is preferably in the range of 300 to 3,000.

A typical general procedure for manufacturing the adhesive compositions of this invention comprises adding a predetermined amount of (A) in the form of granules, a mass, or an emulsion, to a concentrated solution of (B), usually a 10–20% aqueous solution, stirring the mixture at ambient temperature or under heating to below 100° C. to obtain a water-solubilized high molecular weight vinyl compound solution, and then mixing the solution with a predetermined amount of a vinyl polymer emulsion to obtain a homogeneous mixture.

The adhesive compositions of this invention can be applied by conventional methods and machinery to a wide variety of objects to be adhered (substrates) without further treatment, or it can be diluted further, if desired.

The normally water-insoluble synthetic high molecular weight vinyl compounds (A) used as what may be termed "starting materials" in this invention are described in greater detail as follows:

The compounds are vinyl compounds normally insoluble in water with a degree of polymerization of 10 to 3,000, and are essentially linear linked and selected from the group consisting of:

(1) Polyvinyl esters of alkanoic ($C_1$ to $C_4$) acids.
(2) Copolymers of vinyl esters of alkanoic ($C_1$ to $C_4$) acids with copolymerizable monomers.
(3) Polyvinyl acetals of lower alkanoyl ($C_1$ to $C_4$) aldehydes.
(4) Copolymers of vinyl acetals of lower alkanoyl ($C_1$ to $C_4$) aldehydes with copolymerizable monomers.
(5) Polyalkyl ($C_1$ to $C_8$) acrylates.
(6) Copolymers of polyalkyl ($C_1$ to $C_8$) acrylates with copolymerizable monomers.
(7) Copolymers of ethylene with copolymerizable monomers.
(8) Copolymers of polyvinyl acetals of lower alkanoyl ($C_1$ to $C_4$) aldehydes.
(9) Graft copolymers of polyvinyl alcohol with vinyl esters of $C_1$ to $C_4$ alkanoic acids.

Examples of copolymerizable monomers are vinyl pyrrolidone, dibasic alkanoic ($C_1$ to $C_8$) acid anhydrides, alkyl ($C_1$ to $C_8$) acrylates and vinyl esters of $C_1$ to $C_4$ alkanoic acids.

The polyvinyl esters of (1) can include the partial saponification products and can include the partial esterification products of polyvinyl alcohol, as well as graft copolymers of polyvinyl alcohol with vinyl esters of $C_1$ to $C_4$ alkanoic acids.

Particularly, there can be used polyvinyl acetate (PVAc) and partial saponification products thereof, partial acetylation products of polyvinyl alcohol (hereinafter referred to as PVA), graft copolymers of PVA with vinyl acetate, copolymers of vinyl acetate with copolymerizable water-soluble monomers such as vinyl pyrrolidone and maleic anhydride or with water-insoluble monomers such as ethyl acrylate, acetals of PVA with lower aliphatic aldehydes such as formaldehyde, acetaldehyde and butylaldehyde, i.e., polyvinyl acetal, and copolymers thereof, polyethylacrylate an ethyl acrylate-2-ethylhexyl acrylate copolymers.

PVA used for preparing the above acetals is not necessarily pure and can contain in its molecule an alkanoic ($C_1$ to $C_4$) acid such as acetic acid remaining in ester linkage. PVA obtained by hydrolyzing a copolymer of vinyl acetate and another polymerizable substance, such as vinyl pyrrolidone, maleic anhydride or an acrylic ester can be used. Also, copolymers of ethylene with vinyl acetate or ethyl acrylate and graft copolymers obtained by, for example, the graft-copolymerization of PVA with vinyl acetate can be used.

Infusible and insoluble high molecular compounds having intermolecular cross-linked three-dimensional structures cannot be used.

The degree of polymerization of the high molecular vinyl compounds (A) should be in such a range that they are soluble in a concentrated solution of resin acid surface active agent as described below. As previously stated, the degree of polymerization should be at least 10, preferably in the range of 100–3,000.

The resin acid anionic surface active agents (B) used for accomplishing the water solution or dispersion of (A) are selected from the group consisting of:

(1) Alkali metal salts of resin acids for example abietic acid
(2) Alkali metal salts of rosin
(3) Alkali metal salts tall rall oil rosin
(4) Alkali metal salts of tall oil
(5) $\alpha,\beta$-Unsaturated polybasic hydrocarbon carboxylic acid adducts aof (1), (2), (3) or (4), for example the maleic acid adducts
(6) Alkali metal salts of (5)
(7) Alkali metal salts of disproportionated rosin
(8) Alkali metal salts of disproportionated tall oil rosin
(3) Alkali metal salts of disproportionated tall oil
(10) Hydrogenated (7), (8) or (9)
(11) Polymerized (7), (8) or (9).

Typical resin acid anionic surface active agents to be used in the present invention are alkali metal salts of resin acids (i.e. abietic acid and other resin acids), alkali metal salts of rosin, alkali metal salts of tall oil rosin, distillated tall oil and purified tall oil, $\alpha,\beta$-unsaturated polybasic acid adducts of the above named surface active agents such as maleic acid adducts or their alkali metal salts and alkali metal salts of disproportionated, hydrogenated polymerized rosin, tall oil rosin and tall oil.

The vinyl polymer emulsion (C) that is mixed with the solution or dispersion of (A) and (B) is an emulsion polymer of a monomer selected from the group consisting of:

(1) Vinyl esters of lower ($C_1$ to $C_4$) alkanoyl acids
(2) Vinyl halides
(3) Ethylene
(4) Styrene
(5) Alkyl ($C_1$ to $C_4$) acrylates
(6) Alkyl ($C_1$ to $C_4$) methacrylates
(7) Copolymers of (1) to (6).

The emulsion of polymer can include a small amount of protective colloid such as polyvinyl alcohol, vinyl ether-maleic anhydride and acrylic acid. It also can contain a conventional emulsifier such as an alkali metal salt of a long chain aliphatic sulfate or sulfonate.

Typical vinyl polymer emulsions to be mixed with the solution of (A) and (B) are polymerized emulsions selected from the group consisting of (1) emulsion polymerization products of emulsion-polymerizable vinyl monomers such as vinyl acetate, vinyl chloride, ethylene, styrene, alkyl ($C_1$–$C_4$) acrylates and alkyl ($C_1$–$C_4$) methacrylates, and (2) emulsion copolymerization products containing those monomers as essential constituents.

The degree of polymerization of the said polymer emulsions should be in such a range that they have film-forming ability. The degree of polymerization should be at least 100, preferably above 300.

DETAILED DESCRIPTION OF THE INVENTION

Example 1

Four parts by weight of polyvinyl acetate (degree of polymerization 1,000) obtained by bulk polymerization were dissolved in an aqueous solution of 16 parts by weight of hydrogenated sodium rosinate in 80 parts by weight of water to obtain a water-solubilized high molecular compound solution. Fifty parts by weight of the solution (calculated solid content 10 parts by weight) were mixed with 100 parts by weight of polyvinyl acetate emulsion (concentration 50%, degree of polymerization about 1,500) obtained by emulsion polymerization in the presence of polyvinyl alcohol as a protective colloid to obtain an adhesive composition. The composition was applied in the amount of 15 g./m.$^2$ on a portion (2.5 x 4.0 cm.$^2$) of a kraft paper of 2.5 x 6.0 cm.$^2$ in size. The paper was adhered to a liner of corrugated board. The adhesive strength was measured by peeling off at an angle of 180 degrees from an edge (portion not coated with the adhesive) of the kraft paper. For the purpose of comparison, tests were carried out under the same conditions on a polyvinyl acetate emulsion which does not contain the water-solubilized high molecular compound solution. The results are given in Table 1.

TABLE 1.—ADHESIVE STRENGTH (g./25 mm.)

| | Example | Comparative composition |
|---|---|---|
| Time after application (min.): | | |
| 0.5 | 120 | 100 |
| 1.0 | *300 | 160 |
| 2.0 | *390 | 220 |
| 3.0 | *480 | *420 |
| 5.0 | *580 | *490 |

*Paper was broken.

As will be clearly seen in the results shown in Table 1, the adhesive compositions of the present invention have excellent initial adhesive strength.

Example 2

Six parts by weight of polyvinyl butyral (acetal 62%, degree of polymerization 1,000) were dissolved in the solution of 14 parts by weight of a disproportionated potassium rosinate in 80 parts by weight of water to obtain a water-solubilized high molecular compound solution. Fifty parts by weight of the solution (calculated solid content 10 parts by weight) were mixed with 100 parts by weight (calculated solid content 50 parts by weight) of ethyl acrylate/vinyl acetate copolymer emulsion (concentration 42%, degree of polymerization about 2,000) prepared by emulsion polymerization in the presence of vinyl ether/maleic anhydride copolymer (mol ratio of vinyl ether to maleic anhdride=1:1, degree of polymerization about 1,800) as a protective colloid and sodium dodecyl sulfonate as an emulsifier, to obtain an adhesive composition. The adhesive strength of the composition (g./25 mm.) between a foamed polystyrene plate and an art paper was measured in the same manner as in Example 1. For the purpose of comparison, tests were also carried out under the same conditions on an ethyl acrylate/vinyl acetate copolymer emulsion which does not contain the water-solubilized high molecular compound solution. The results are shown in Table 2.

TABLE 2.—ADHESIVE STRENGTH (g./25 mm.)

| | Example | Comparative composition |
|---|---|---|
| Time after application: | | |
| 1 minute | 100 | 80 |
| 2 minutes | 210 | 130 |
| 5 minutes | 320 | 150 |
| 1 hour | *510 | 230 |
| 24 hours | *540 | 230 |

*Paper was broken.

Example 3

By emulsion polymerization of butyl acrylate, vinyl acetate and a small amount of acrylic acid in the presence of sodium dodecylsulfate as an emulsifier, an emulsion I (concentration 45%, mol ratio in copolymer composition of butyl acrylate to vinyl acetate=8 to 2; acrylic acid was used in the amount of 2% by weight based on the total amount of butyl acrylate and vinyl acetate) was obtained. Five parts by weight of emulsion I were dissolved in 10 parts by weight of an aqueous solution of polymerized sodium rosin of 45% concentration to obtain the water-solubilized high molecular compound solution II.

The adhesive strength between a polypropylene plate and a kraft paper was measured in the same manner as in Example 1 by using as the adhesive the emulsion I alone (comparative), water-solubilized high molecular compound solution II alone (comparative), a mixed composition III of 60 parts by weight of emulsion I and 40 parts by weight of water-solubilized high molecular compound solution II (a composition of the present invention) and a mixed composition IV of 85 parts by weight of emulsion I and 15 parts by weight of water-solubilized high molecular compound solution II (another composition of the present invention). The results are shown in Table 3.

TABLE 3.—ADHESIVE STRENGTH (g./25 mm.)

| | Comparison | | Example | |
|---|---|---|---|---|
| | I | II | III | IV |
| Time after application: | | | | |
| 1 minute | 80 | 90 | *260 | *280 |
| 2 minutes | 130 | 140 | *400 | *470 |
| 5 minutes | 150 | *270 | *460 | *480 |
| 1 hour | 220 | *690 | *700 | *700 |
| 24 hours | 220 | *700 | *750 | *740 |

*Paper was broken.

As will be clearly seen in the results shown in Table 3, the improvement in initial adhesive strength by mixing a water-solubilized high molecular compound solution with a vinyl polymer emulsion is observed. Accordingly, the time required for drying the adhesive can be reduced.

Example 4

A composition prepared by mixing 100 parts by weight of ethylene/vinyl acetate emulsion (EVA, concentration 45%, weight ratio of the former to the latter in the copolymer=7:3, degree of polymerization about 1,700) with 20 parts by weight (calculated solid content) of the water-solubilized high molecular compound solution used in Example 3 (a composition of the present invention), a composition prepared by mixing 100 parts by weight of ethylene/vinyl acetate emulsion with 20 parts by weight of dibutyl phthalate (DBP) as a plasticizer or with 20 parts by weight of polyvinyl alcohol (PVA) as a viscosity-increasing agent (comparison) and ethylene-vinyl acetate emulsion alone (comparison) were used as adhesives. The adhesives were applied in the amount of 15 g./m.² (calculated in terms of solution) onto test pieces of kraft paper the same as that used in Example 1 and the test pieces were attached to various subjects. After standing for 24 hours to dry, the test pieces were peeled off gradually at an angle of 90 degrees from an edge according to the specification of JIS K0218. The ratio of the area broken by the peeling to the adhered area on the paper (ratio of broken area, percent) was measured in each case to evaluate the adhesive strength. The results are shown in Table 4.

TABLE 4.—RATIO OF BROKEN AREA (PERCENT)

| | Example | Comparison | | |
|---|---|---|---|---|
| Subjects | EVA+water-solubilized high molecular compound solution | EVA +DBP | EVA +PVA | EVA alone |
| Polyvinyl chloride plate | 100 | 100 | 80 | 100 |
| Stretched polyvinyl chloride film | 100 | 50 | 0 | 0 |
| Polystyrene plate | 100 | 100 | 0 | 0 |
| Polycarbonate plate | 100 | 100 | 100 | 100 |
| ABS resin plate | 100 | 100 | 70 | 80 |
| Polypropylene plate | 100 | 0 | 0 | 0 |
| Polyethylene plate | 0 | 0 | 0 | 0 |
| Flame-treated polyethylene plate | 100 | 100 | 100 | 100 |

Thus, the adhesives of the present invention exhibit excellent adhesive properties for a wide range of objects.

What we claim is:

1. An adhesive composition consisting essentially of a homogeneous mixture of
   (I) an aqueous solution of a water-solubilized high molecular weight polyvinyl compound, obtained by dissolving in water containing from 10 to 100 parts by weight of resin acid anionic surface active agent,
      (A) from 10 to 100 parts by weight of a water-insoluble, high molecular weight, essentially linear linked, polyvinyl compound having a degree of polymerization of from 10 to 3000 and selected from the group consisting of
         polyvinyl acetate, copolymers of vinyl acetate with butyl acrylate and acrylic acid, polyvinyl butyral, polyalkyl acrylates in which the alkyl has from 1 to 8 carbon atoms, copolymers of ethylacrylate with 2-ethylhexyl acrylate, and copolymers of ethylene with vinyl acetate and
   (II) 100 parts by weight of an emulsion of a film-forming vinyl polymer having a degree of polymerization of at least 100, said polymer being made from a monomer selected from the group consisting of
      vinyl acetate, vinyl chloride, ethylene, styrene, alkyl acrylates in which the alkyl has from 1 to 4 carbon atoms, alkyl methacrylates in which the alkyl has from 1 to 4 carbon atoms, copolymers of ethylene with vinyl acetate, copolymers of vinyl acetate with butyl acrylate and acrylic acid, and copolymers of vinyl acetate with ethyl acrylate.

2. An adhesive composition according to claim 1, in which the vinyl compound has a degree of polymerization in the range of 100–3,000.

3. An adhesive composition according to claim 1, in which the resin acid surface active agent is selected from the group consisting of (1) alkali metal salts of resin acids and maleic acid adducts of said resin acid salts, (2) alkali metal salts of rosin and maleic acid adducts of said rosin salts, and (3) alkali metal salts of disproportionated, hydrogenated or polymerized rosin.

References Cited

UNITED STATES PATENTS

| 2,532,223 | 11/1950 | Bromley | 260—23 |
| 3,234,161 | 2/1966 | Snelgrove | 260—29.6 |
| 3,487,036 | 12/1969 | Bissot | 260—27 |

FOREIGN PATENTS

| 894,855 | 4/1962 | Great Britain. |

DONALD E. CZAJA, Primary Examiner

W. E. PARKER, Assistant Examiner

U.S. Cl. X.R.

260—23 AC, 29.6 H